(12) United States Patent
Sun et al.

(10) Patent No.: US 11,991,442 B2
(45) Date of Patent: May 21, 2024

(54) METHOD AND DEVICE FOR PREDICTING USER'S INTENT

(71) Applicant: MediaTek Singapore Pte. Ltd., Singapore (SG)

(72) Inventors: Guangyu Sun, Beijing (CN); Libo Kang, Beijing (CN); Jiangli Liu, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 176 days.

(21) Appl. No.: 17/845,020

(22) Filed: Jun. 21, 2022

(65) Prior Publication Data

US 2023/0319398 A1    Oct. 5, 2023

(30) Foreign Application Priority Data

Apr. 2, 2022    (CN) .......................... 202210352977.4

(51) Int. Cl.
*H04N 23/661*   (2023.01)
*G01P 15/18*    (2013.01)
(Continued)

(52) U.S. Cl.
CPC ........... *H04N 23/661* (2023.01); *G01P 15/18* (2013.01); *H04N 23/611* (2023.01); *H04W 4/80* (2018.02)

(58) Field of Classification Search
CPC .. H04N 23/611; H04N 23/661; H04N 19/103; H04N 21/44213; H04W 4/80;
(Continued)

(56) References Cited

U.S. PATENT DOCUMENTS

| 10,628,573 | B2 * | 4/2020  | Gibbs | ................... G06T 21/34 |
| 2018/0375985 | A1 * | 12/2018 | Sun   | ................... G06Q 20/326 |

(Continued)

FOREIGN PATENT DOCUMENTS

| CN | 106933338 B | 1/2020 |
| CN | 114090102 A | 2/2022 |

OTHER PUBLICATIONS

Chinese language office action dated Jan. 31, 2023, issued in application No. TW 111123448.

*Primary Examiner* — Marly S Camargo
(74) *Attorney, Agent, or Firm* — McClure, Qualey & Rodack, LLP

(57) ABSTRACT

A method for predicting user's intent is provided. The method is performed by a computing device and includes: receiving spatial information and acceleration data from a portable device and a wearable device worn by a user, wherein the wearable device and the portable device measure the spatial information between each other via UWB when either the wearable device or the portable device detects that an activity of the user or a motion status of either the wearable device or the portable device has changed based on the acceleration data measured by accelerometers in the wearable device and the portable device; identifying a behavior of the user using the wearable device and the portable device and predicting user's intent based on the spatial information and the acceleration data; and transmitting a notification signal to the wearable device to notify the user of user's intent.

22 Claims, 11 Drawing Sheets

(51) Int. Cl.
    *G06F 3/01*            (2006.01)
    *G06F 3/16*            (2006.01)
    *G06F 30/327*        (2020.01)
    *G06V 40/20*         (2022.01)
    *H04N 23/611*       (2023.01)
    *H04W 4/80*         (2018.01)

(58) Field of Classification Search
    CPC ........ G01P 15/18; G06F 30/327; G06F 11/34;
                  G06F 1/163; G06F 3/01; G06F 3/012;
               G06F 3/013; G06F 30/133; G06F 3/16;
                             G06V 40/20–28
    See application file for complete search history.

(56) References Cited

U.S. PATENT DOCUMENTS

2019/0182415 A1\*   6/2019   Sivan ...................... G06F 3/012
2020/0195833 A1    6/2020   Sivan
2022/0381869 A1\* 12/2022   Sun ........................... G01S 5/12
2023/0400568 A1\* 12/2023   Kang .................... G01S 13/765

\* cited by examiner

METHOD AND DEVICE FOR PREDICTING USER'S INTENT

CROSS REFERENCE TO RELATED APPLICATIONS

This application claims priority from China Patent Application No. 202210352977.4, filed on Apr. 2, 2022, the disclosure of which is incorporated herein in its entirety by reference.

BACKGROUND

Technical Field

The present disclosure generally relates to a method and device for predicting user's intent. More specifically, aspects of the present disclosure relate to a method and device for predicting user's intent by using an accelerometer and Ultra-Wideband (UWB) technology.

Description of the Related Art

Ultra-wideband (UWB) technology is a short-distance wireless communications technology. The UWB technology has the characteristics of immunity to interference, high-precision spatial perception, and high data transmission safety. However, most mobile devices or wearable devices cannot periodically and actively initiate the measurement of spatial information through the low power consumption of UWB.

Accelerometers perceive motion and movements with low power consumption, but motion/movement recognition by the accelerometers is only suitable for scenes with obvious features and a single motion.

Accordingly, a need exists for a method and a device predicting user's intent and a system thereof that combines Ultra-Wideband (UWB) configurations with accelerometers to predict user's intent. The present invention is directed to such a need.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a method and a device predicting user's intent to overcome the above disadvantages.

In an exemplary embodiment, a method for predicting user's intent, wherein the method is performed by a computing device and comprises: receiving spatial information and acceleration data from a portable device and a wearable device worn by a user, wherein the wearable device and the portable device are configured to measure the spatial information between each other via Ultra-Wideband (UWB) when either the wearable device or the portable device detects that an activity of the user or a motion status of either the wearable device or the portable device has changed based on the acceleration data measured by accelerometers in the wearable device and the portable device; identifying a behavior of the user using the wearable device and the portable device and predicting user's intent based on the spatial information and the acceleration data; and transmitting a notification signal to the wearable device to notify the user of user's intent or performing an operation in response to the user's intent.

In some embodiments, the spatial information comprises: a distance between the wearable device and the portable device; a direction angle of the wearable device relative to the portable device; and a relative relationship between the wearable device and the portable device.

In some embodiments, the activity of the user comprises driving a vehicle, riding a bicycle, running, walking, or sitting or standing still.

In some embodiments, the motion status comprises rising, rotating, tilting or falling.

In some embodiments, the computing device is either the wearable device or the portable device.

In some embodiments, identifying the behavior of the user using the wearable device and the portable device and predicting user's intent based on the spatial information and the acceleration data further comprises: identifying that the user is watching the portable device when detecting that the distance between the wearable device and the portable device is less than a first threshold, the portable device is in a field of view (FOV) of the wearable device and the wearable device is not in a FOV of the portable device, and the direction angle of the wearable device relative to the portable device is substantially equal to 0° based on the spatial information; detecting whether the distance between the wearable device and the portable device is less than a second threshold and a head-tilt angle of the user is within a specific range based on the spatial information; and predicting that the user is watching the portable device with an incorrect posture when the distance between the wearable device and the portable device is less than the second threshold and the head-tilt angle of the user is within the specific range.

In some embodiments, identifying the behavior of the user using the wearable device and the portable device and predicting user's intent based on the spatial information and the acceleration data further comprises: identifying that the user wants to take a selfie using the portable device when detecting that the distance between the wearable device and the portable device is within a specific range, the portable device is in the field of view (FOV) of the wearable device and the wearable device is in the FOV of the portable device, and the direction angle of the wearable device relative to the portable device is substantially equal to 0° based on the spatial information; detecting whether the portable device is being held by the user and the wearable device and the portable device remain in a face-to-back (F2B) state for longer than a predetermined time; and predicting that the user is taking a selfie using the portable device when the portable device is being held by the user and the wearable device and the portable device remain in the F2B state for longer than the predetermined time.

In some embodiments, identifying the behavior of the user using the wearable device and the portable device and predicting user's intent based on the spatial information and the acceleration data further comprises: identifying that the user wants to remotely take photos using the portable device when detecting that the distance between the wearable device and the portable device is greater than a threshold, the portable device is in a field of view (FOV) of the wearable device and the wearable device is in a FOV of the portable device, and the direction angle of the wearable device relative to the portable device is substantially equal to 0° based on the spatial information; detecting whether the portable device is still or being held by another user and a camera application of the portable device is running based on the spatial information and the acceleration data; and predicting that the user is using the camera application to remotely take photos when the portable device is still or being held by another user and the camera application of the portable device is running.

In some embodiments, identifying the behavior of the user using the wearable device and the portable device and predicting user's intent based on the spatial information and the acceleration data further comprises: identifying that the user has given the portable device to another user when detecting that the distance between the wearable device and the portable device is within a specific range and the portable device is not moving and being held by another user; detecting whether the portable device is unlocked and the portable device is being used by another user; and predicting that the user has lent the portable device to another user when the portable device is unlocked and the portable device is being used by another user.

In some embodiments, identifying the behavior of the user using the wearable device and the portable device and predicting user's intent based on the spatial information and the acceleration data further comprises: identifying that the user is moving away from the portable device when detecting that the distance between the wearable device and the portable device is greater than a threshold, and the portable device and the wearable device are moving at different speeds; detecting whether the portable device is locked or the portable device is unlocked and keeps still; and predicting that the portable device is lost when the portable device is locked or the portable device is unlocked and keeps still.

In some embodiments, identifying the behavior of the user using the wearable device and the portable device and predicting user's intent based on the spatial information and the acceleration data further comprises: identifying that the user is moving away from the portable device when detecting that the distance between the wearable device and the portable device is greater than a threshold, and the portable device is not moving and the wearable device is moving; detecting whether the portable device is in a specific location and the portable device remains in a standby mode; and predicting that the user has left the portable device in the specific location when the portable device is in the specific location and the portable device remains in the standby mode.

In some embodiments, the wearable device is a pair of smart glasses.

In an exemplary embodiment, a device for predicting user's intent, comprising: one or more processors; and one or more computer storage media for storing one or more computer-readable instructions, wherein the processor is configured to drive the computer storage media to execute the following tasks: receiving spatial information and acceleration data from a portable device and a wearable device worn by a user, wherein the wearable device and the portable device are configured to measure the spatial information between each other via Ultra-Wideband (UWB) when either the wearable device or the portable device detects that an activity of the user or a motion status of either the wearable device or the portable device has changed based on the acceleration data measured by accelerometers in the wearable device and the portable device; identifying a behavior of the user using the wearable device and the portable device and predicting user's intent based on the spatial information and the acceleration data; and transmitting a notification signal to the wearable device to notify the user of user's intent or performing an operation in response to the user's intent.

In an exemplary embodiment, a system for predicting user's intent, comprising: a wearable device, worn by a user; a portable device, connected to the wearable device; and a computing device, connected to the wearable device and the portable device; wherein the computing device receives spatial information and acceleration data from the portable device and the wearable device, wherein the wearable device and the portable device are configured to measure the spatial information between each other via Ultra-Wideband (UWB) when either the wearable device or the portable device detects that an activity of the user or a motion status of either the wearable device or the portable device has changed based on the acceleration data measured by accelerometers in the wearable device and the portable device; the computing device identifies a behavior of the user using the wearable device and the portable device and predicting user's intent based on the spatial information and the acceleration data; and the computing device transmits a notification signal to the wearable device to notify the user of user's intent or performing an operation in response to the user's intent.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

Figure 1:
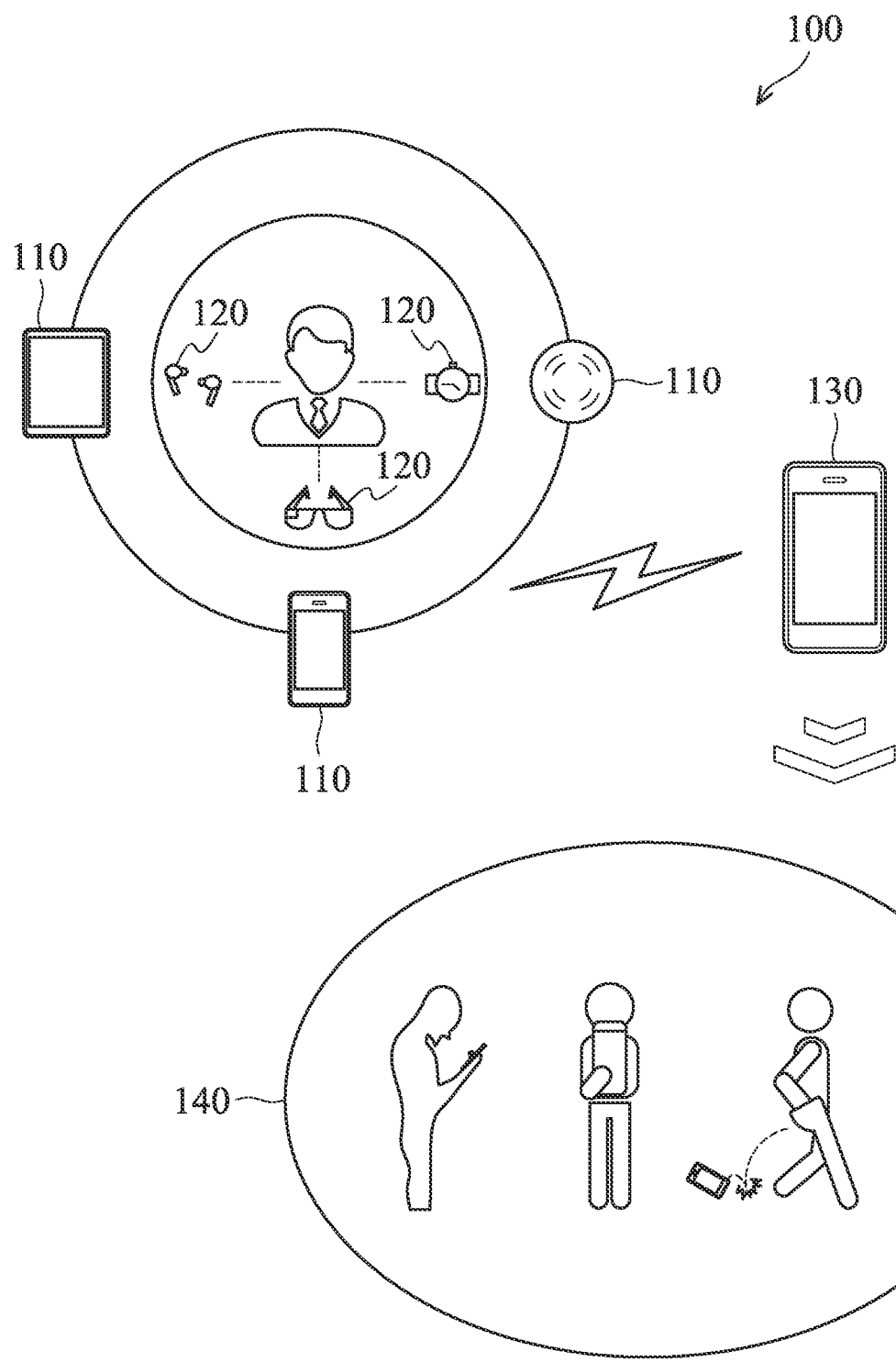
FIG. 1 shows a schematic diagram of a system for predicting user's intent according to an exemplary embodiment of the present disclosure.

FIG. 1 shows a schematic diagram of a system 100 for predicting user's intent according to an exemplary embodiment of the present disclosure. Example system 100 may include at least one portable device 110, at least one wearable device 120 and a computing device 130.

The portable device 110 may comprise a mobile terminal, such as a mobile phone, music player, tablet, netbook or any portable device. The wearable device 120 may include smart glasses, earphone, smart watches or any electronic devices configured to be worn by a user. Those skilled in the art will appreciate that these are merely example consoles for descriptive purposes and this disclosure is not limited to any console or device.

The portable device 110 and the wearable device 120 may also include one or more sensors and transceivers (e.g., a proximity sensor, ambient light sensor (ALS), accelerometer, gyroscope, magnetometer, barometric pressure sensor, Global Positioning System (GPS) sensor, Bluetooth Low Energy (BLE) transceiver, or Ultra-Wideband (UWB) transceiver).

It should be noted that the portable device 110, the wearable device 120 and the computing device 130 may be capable of communicating using multiple wireless communication standards. For example, the portable device 110, the wearable device 120 and the computing device 130 can be configured to communicate using two or more of Wireless Local Area Network (WLAN), Bluetooth, ZigBee, Worldwide Interoperability for Microwave Access (WiMAX), Third Generation Of Wireless Mobile Telecommunications Technology (3G), Fourth Generation Of Cellular Network Technology (4G), Long Term Evolution (LTE) or LTE-Advanced, one or more global navigational satellite systems (GNSS, e.g., Global Positioning System (GPS) or Assisted Global Positioning System (AGPS)), etc. Other combinations of wireless communication standards (including more than two wireless communication standards) are also possible.

The computing device 130 may use data or information received from the portable device 110 and the wearable devices 120 to predict user's intent (situation 140). In one embodiment, the computing device 130 may be the portable device 110 or the wearable device 120.

Figure 2:
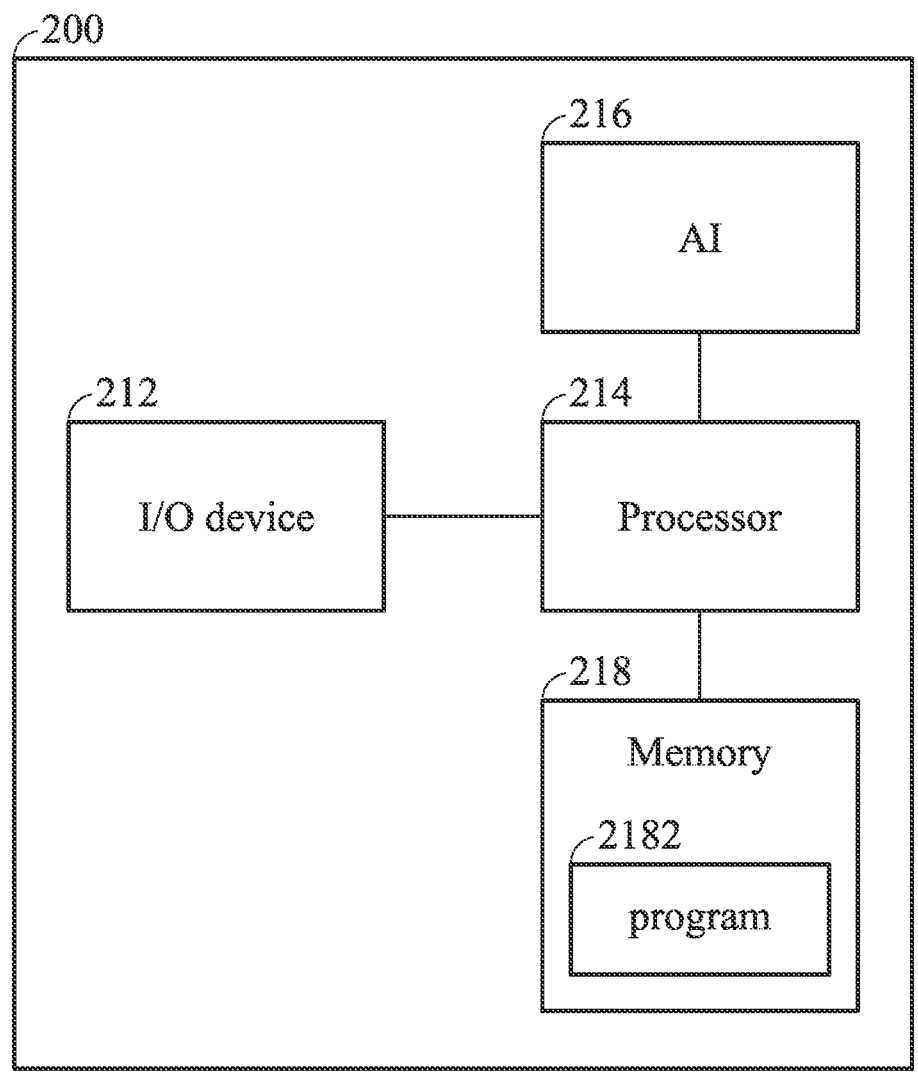
FIG. 2 is a simplified functional block diagram illustrating an electronic device according to an embodiment of the disclosure.

FIG. 2 is a simplified functional block diagram illustrating an electronic device 200 according to an embodiment of the disclosure. The electronic device 200 could be the portable device 110, the wearable device 120 or the computing device 130 in FIG. 1.

The electronic device 200 may include at least one input/output (I/O) device 212, a processor 214, an artificial intelligence (AI) 216, and a memory 218 which may store program 2182. The processor 214 may be any type of processing device for executing software instructions, such as for example, a microprocessor device. The memory 218 may include, but is not limited to, random access memory (RAM), and/or read only memory (ROM). The memory 218 may include any of: electronically erasable programmable read only memory (EEPROM), flash memory or other memory technology, CD-ROM, digital versatile disks (DVD) or other optical disk storage, magnetic storage devices, or any other medium that can be used to store the desired information and that can be accessed by the electronic device 200.

The processor 214 and the memory 218 also may be directly or indirectly connected to the I/O device 212. An output part of the I/O device 212 may include, for example, a display device, television, printer, stereo, or speakers. In some embodiments one or more display devices may be incorporated into a pair of smart glasses. The display devices incorporated into the smart glasses may provide feedback to users. The input part of the I/O device 212 may include, for example, a keyboard, touch screen, a remote control pad, a pointing device (such as a mouse, touchpad, stylus, trackball, or joystick), a scanner, a camera or a microphone. In this regard, the I/O device 212 may comprise one or more sensors configured to sense, detect, and/or measure a motion status from a user. In addition, the I/O device 212 may also comprise a UWB transceiver to measure the absolute distance and/or the relative distance between devices. UWB transceivers and technologies are known to those familiar with radio frequency (RF) communication techniques, and UWB technology will not be described in detail here.

The artificial intelligence 216 may recognize the activity of the user or the motion status of the wearable device and the portable device based on sensing data generated by the sensors. In addition, the artificial intelligence 216 may further identify a behavior of a user and predict user's intent based on acceleration data generated by the accelerometers and spatial information generated by the UWB transceivers. In one embodiment, the artificial intelligence 216 may be implemented in the processor 214.

Figure 3:
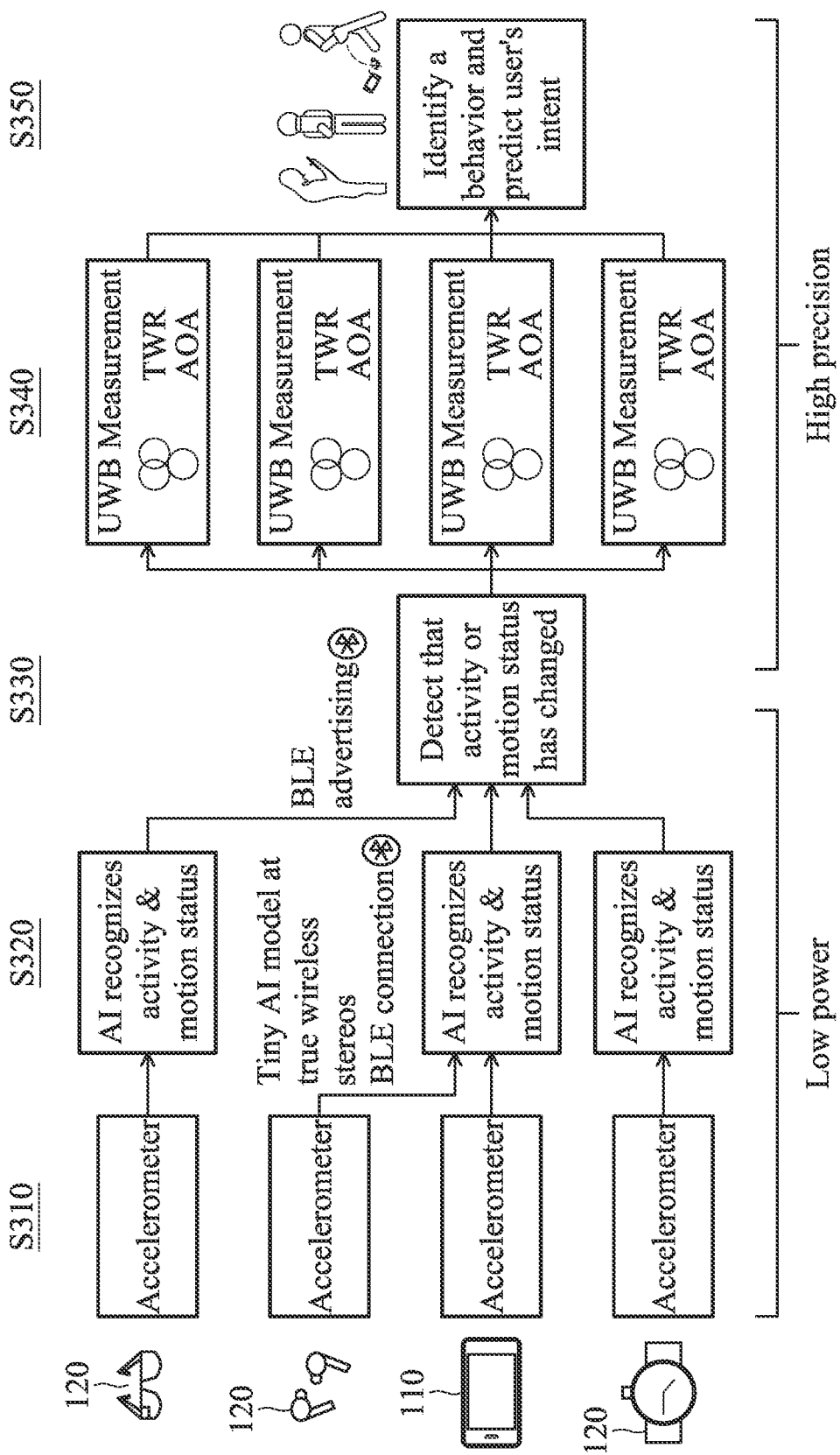
FIG. 3 is an overall flowchart illustrating a method for predicting user's intent according to an embodiment of the present disclosure.

FIG. 3 is an overall flowchart illustrating a method 300 for predicting user's intent according to an embodiment of the present disclosure. The method could be implemented in the portable device 110, the wearable devices 120 and the computing device 130 as shown in FIG. 1. In this embodiment, devices (the portable device 110, the wearable devices 120 and the computing device 130) can communicate with via Bluetooth.

As shown in FIG. 3, in step S310, the portable device 110 and the wearable devices 120 may obtain acceleration data by using respective low-power accelerometer. In step S320, the AI in the portable device 110 and the wearable devices 120 may respectively recognize a current activity of the user or a motion status of the device (the portable device 110 or the wearable devices 120) itself.

In step S330, the computing device 130 detects that an activity of the user or a motion status of either the wearable device or the portable device has changed based on acceleration data. In one embodiment, the step S330 may be performed by one of the wearable devices 120 and the portable device 110.

In step S340, the computing device 130 may actively trigger the wearable devices 120 and the portable device 110 to perform UWB measurements with high accuracy to obtain spatial information between devices, wherein the UWB measurements may comprise two-way ranging (TWR) and angle of arrival (AoA) measurement technique.

In step S350, the computing device 130 identifies a behavior of the user and predicts user's intent based on the spatial information and the acceleration data.

Figure 4:
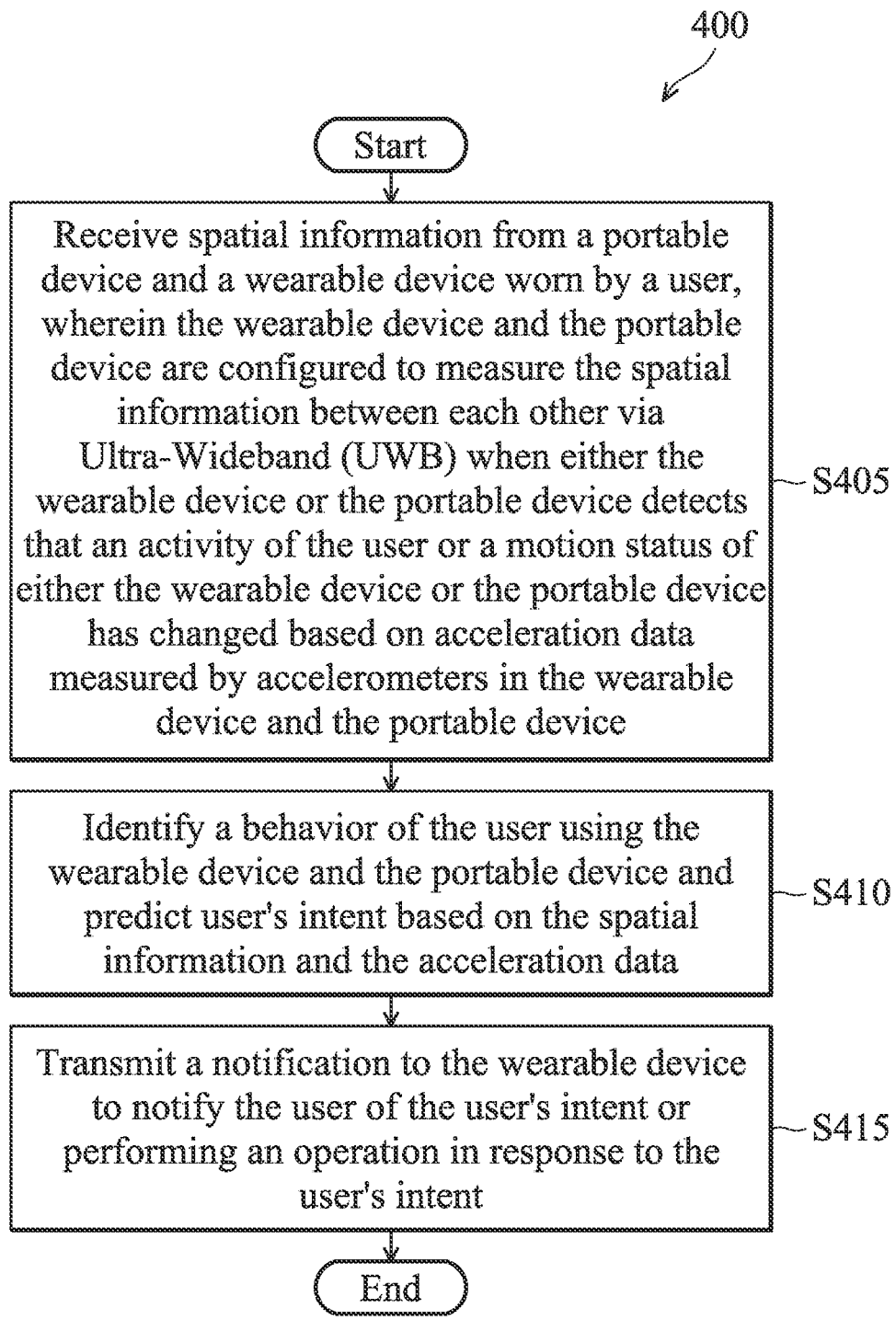
FIG. 4 is a flowchart illustrating a method for predicting user's intent according to an embodiment of the present disclosure.

FIG. 4 is a flowchart illustrating a method 400 for predicting user's intent according to an embodiment of the present disclosure. The method could be implemented in the processor of the computing device 130 as shown in FIG. 1.

In step S405, the computing device receives spatial information and acceleration data from a portable device and a wearable device worn by a user, wherein the wearable device and the portable device are configured to measure the spatial information between each other via Ultra-Wideband (UWB) when either the wearable device or the portable device detects that an activity of the user or a motion status of either the wearable device or the portable device has changed based on the acceleration data measured by accelerometers in the wearable device and the portable device.

In this embodiment, the acceleration data comprises acceleration information related to the wearable device and the portable device in one, two, or three spatial dimensions and/or one temporal dimension with positive and negative directions for any single dimension, or combinations thereof. The spatial information comprises a distance between the wearable device and the portable device, a direction angle of the wearable device relative to the portable device and a relative relationship between the wearable device and the portable device.

The activity of the user in step S405 comprises driving a vehicle, riding a bicycle, running, walking, or sitting or standing still, and the motion status in step S405 comprises rising, rotating, tilting or falling.

Then, in step S410, the computing device identifies a behavior of the user using the wearable device and the portable device and predicts user's intent based on the spatial information and the acceleration data.

In step S415, the computing device transmits a notification to the wearable device to notify the user of the user's intent or performing an operation in response to the user's intent.

Here are some examples to illustrate how the computing device identifies the behavior of the user using the wearable device and the portable device and predicts the user's intent based on the spatial information and the acceleration data after receiving the spatial information and the acceleration data. It should be understood that the computing device may be a portable device (such as a mobile phone) and the wearable device may be a pair of smart glasses in these examples.

Example 1

Figure 5:
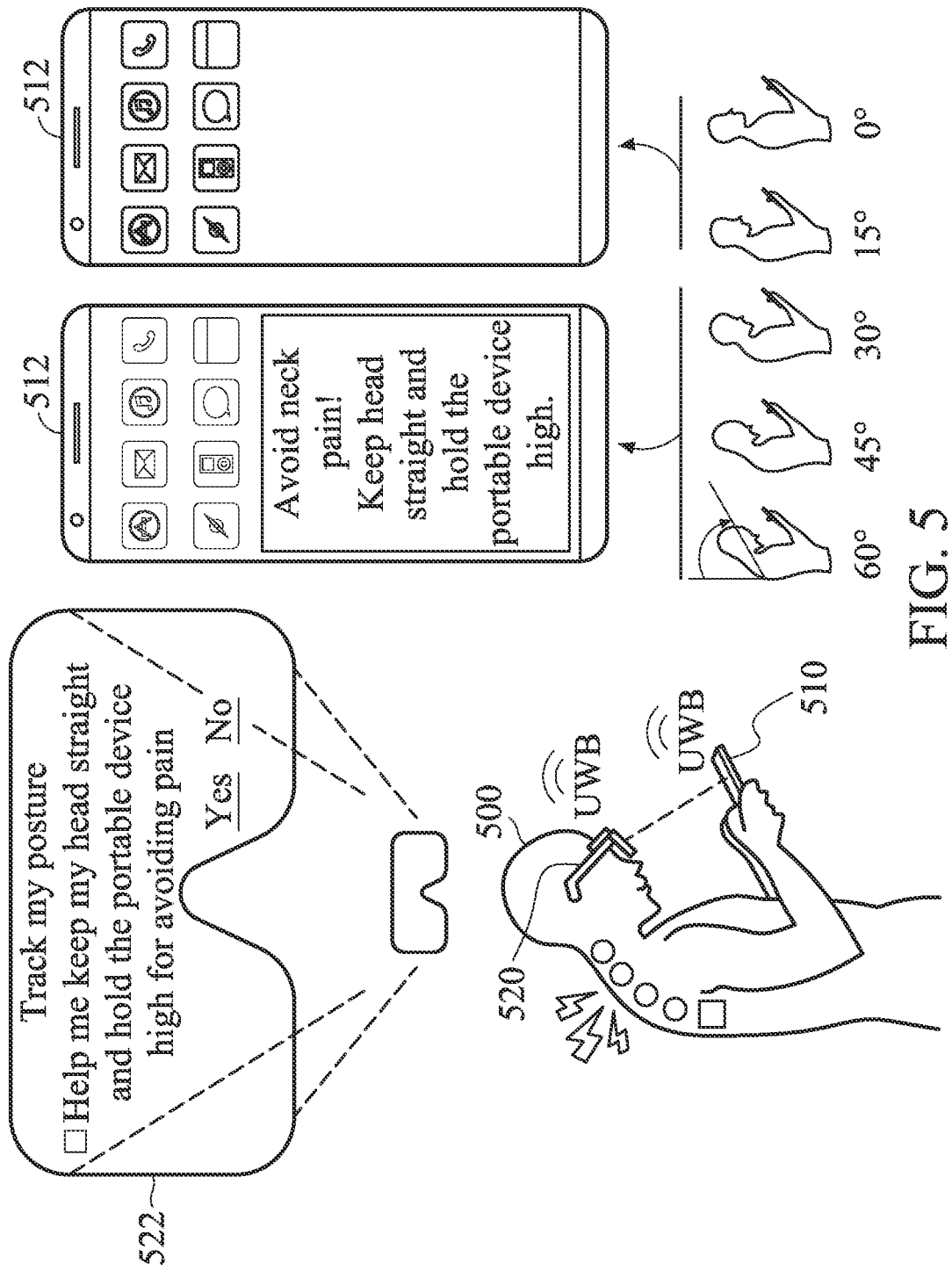
FIG. 5 is a schematic diagram showing a situation where a user is watching the portable device with an incorrect posture according to an exemplary embodiment of the present disclosure.

FIG. 5 is a schematic diagram showing a situation where a user 500 is watching the portable device 510 with an incorrect posture according to an exemplary embodiment of the present disclosure.

First, the portable device 510 identifies that the user is watching the portable device 510 when either the portable device 510 or the wearable device 520 detects that the distance between the wearable device 520 and the portable device 510 is less than a first threshold, the portable device 510 is in the field of view (FOV) of the wearable device 520 and the wearable device 520 is not in the FOV of the portable device 510, and the direction angle of the wearable device 520 relative to the portable device 510 is substantially equal to 0° based on the spatial information, wherein the first threshold is a length of 0.2 m to 0.6 m, and the direction angle of the wearable device 520 relative to the portable device 510 may be obtained based on the angle-of-arrival (AoA) measurement obtained by the UWB transceiver.

Next, the portable device 510 detects whether the distance between the wearable device 520 and the portable device 510 is less than a second threshold and a head-tilt angle of the user 500 is within a specific range based on the spatial information, wherein the second threshold is 0.3 m, and the specific range that is measured by gyroscopes in the portable device 510 and the wearable device 520 is from 30° to 60°.

When the distance between the wearable device 520 and the portable device 510 is less than the second threshold and the head-tilt angle of the user 500 is within the specific range, the portable device 510 predicts that the user 500 is watching the portable device with an incorrect posture.

When the portable device 510 predicts that the user is watching the portable device 510 with an incorrect posture, the portable device 510 may transmit a notification to the wearable device 520 to notify the user 500 of user's intent. In this example, the lenses of the wearable device 520 and the screen of the portable device 510 may display a notification 522 and 512 (e.g., tips to help the user 500 keep his or her head straight and hold the portable device 510 high) to notify the user 500 respectively.

In addition, the portable device 510 may also perform an operation (e.g., the portable device 510 may adjust the screen light according to the posture of the user 500) in response to the user's intent.

Example 2

Figure 6:
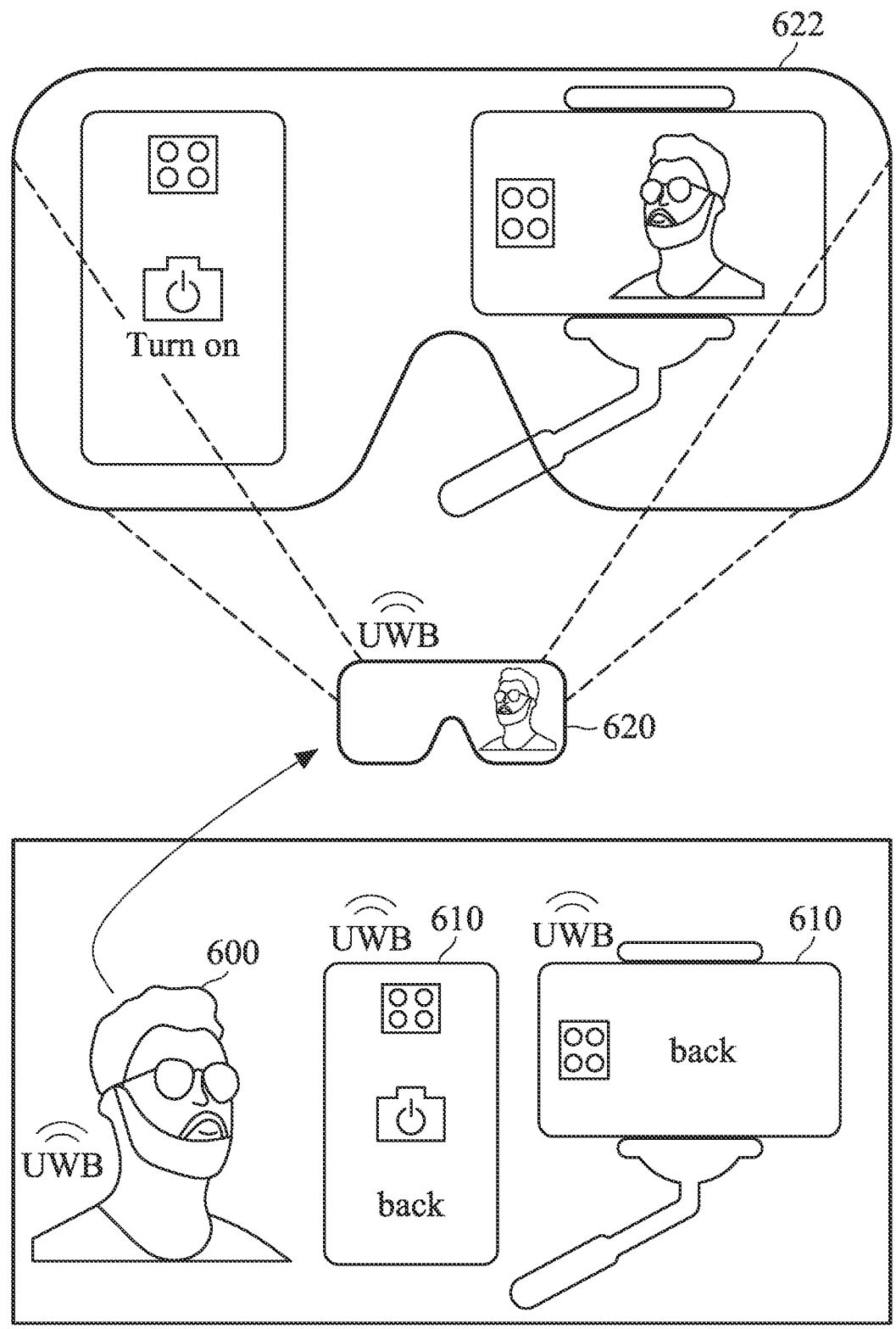
FIG. 6 is a schematic diagram showing a situation where a user is taking a selfie according to an exemplary embodiment of the present disclosure.

FIG. 6 is a schematic diagram showing a situation where a user 600 is taking a selfie according to an exemplary embodiment of the present disclosure.

First, the portable device 610 identifies that the user 600 wants to take a selfie using the portable device 610 when either the portable device 610 or the wearable device 620 detects that the distance between the wearable device 620 and the portable device 610 is within a specific range, the portable device 610 is in the field of view (FOV) of the wearable device 620 and the wearable device 620 is in the FOV of the portable device 610, and the direction angle of the wearable device relative to the portable device is substantially equal to 0° based on the spatial information, wherein the specific range is within 0.3 m to 1.5 m, and the direction angle of the wearable device 620 relative to the portable device 610 may be obtained based on the angle-of-arrival (AoA) measurement obtained by the UWB transceivers.

Next, the portable device 610 detects whether the portable device 610 is being held by the user 600 or a selfie stick based on the spatial information and the acceleration data obtained by the accelerometers and the UWB transceivers in the portable device 610 and the wearable device 620, and detects whether the wearable device 620 and the portable device 610 remain in a face-to-back (F2B) state for longer than a predetermined time, wherein the predetermined time is 2 seconds.

When the portable device 610 is being held by the user 600 or a selfie stick and the wearable device 620 and the portable device 610 remains in the F2B state for longer than the predetermined time, the portable device 610 predicts that the user 600 is taking a selfie using the portable device 610 or a selfie stick.

When the portable device 610 predicts that the user 600 is taking a selfie using the portable device 610 or a selfie stick, the portable device 610 may transmit a notification to the wearable device 620 to notify the user 600 of user's intent. In this example, the lenses of the wearable device 620 may display a notification 622 to notify the user 600. Some examples of notifications 622 are as follows. The wearable device 620 may show a control user interface (UI) of a rear camera of the portable device 610 and a reminder "Turn on", and show a preview video from the portable device 610 when the user 600 turns on the camera, etc.

In addition, the portable device 610 may also perform an operation (e.g., the portable device 610 may automatically adjust the focus of a camera in the portable device 610 according to the change in distance between the portable device 610 and the wearable device 620) in response to the user's intent.

Example 3

Figure 7:
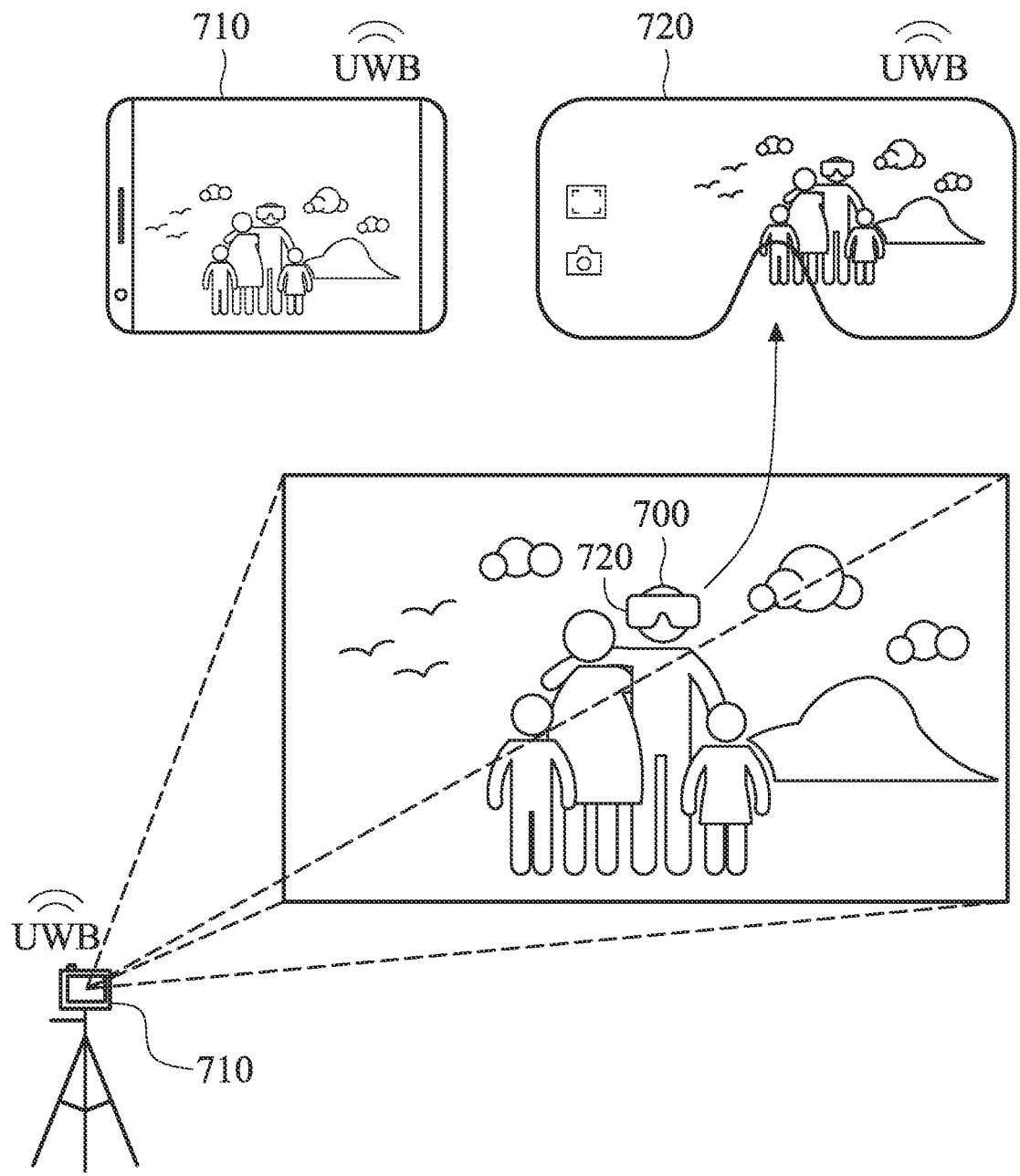
FIG. 7 is a schematic diagram showing a situation where a user is remotely taking photos according to an exemplary embodiment of the present disclosure.

FIG. 7 is a schematic diagram showing a situation where a user 700 is remotely taking photos according to an exemplary embodiment of the present disclosure.

First, the portable device 710 identifies that the user 700 wants to remotely take photos using the portable device 710 when either the portable device 710 or the wearable device 720 detects that the distance between the wearable device 720 and the portable device 710 is greater than a threshold, the portable device 710 is in the field of view (FOV) of the wearable device 720 and the wearable device 720 is in the FOV of the portable device 710, and the direction angle of the wearable device 720 relative to the portable device 710 is substantially equal to 0° based on the spatial information, wherein the threshold is 1.5 m, and the direction angle of the wearable device 720 relative to the portable device 710 may be obtained based on the angle-of-arrival (AoA) measurement obtained by the UWB transceivers.

Next, the portable device 710 detects whether the portable device 710 is still or being held by another user and the camera application of the portable device 710 is running based on the spatial information and the acceleration data obtained by the accelerometers and the UWB transceivers in the portable device 710 and the wearable device 720.

When the portable device 710 is still or being held by another user and the camera application of the portable device 710 is running, the portable device 710 predicts that the user 700 is using the camera application to remotely take photos.

When the portable device 710 predicts that the user 700 uses the camera application to remotely take photos, the portable device 710 may transmit a notification to the wearable device 720 to notify the user 700 of user's intent. In this example, the lenses of the wearable device 720 may display a notification to notify the user 700. Some examples of notifications are as follows. The wearable device 720 may show a control user interface (UI) of a rear camera of the portable device 710 for taking photos and show a preview video of a rear camera of the portable device 710.

In addition, the portable device 710 may also perform an operation (e.g., the portable device 710 automatically closes the display of the wearable device 720 to avoid the image or video shown in the wearable device 720 from affecting the photo taken by the portable device 710).

Example 4

Figure 8:
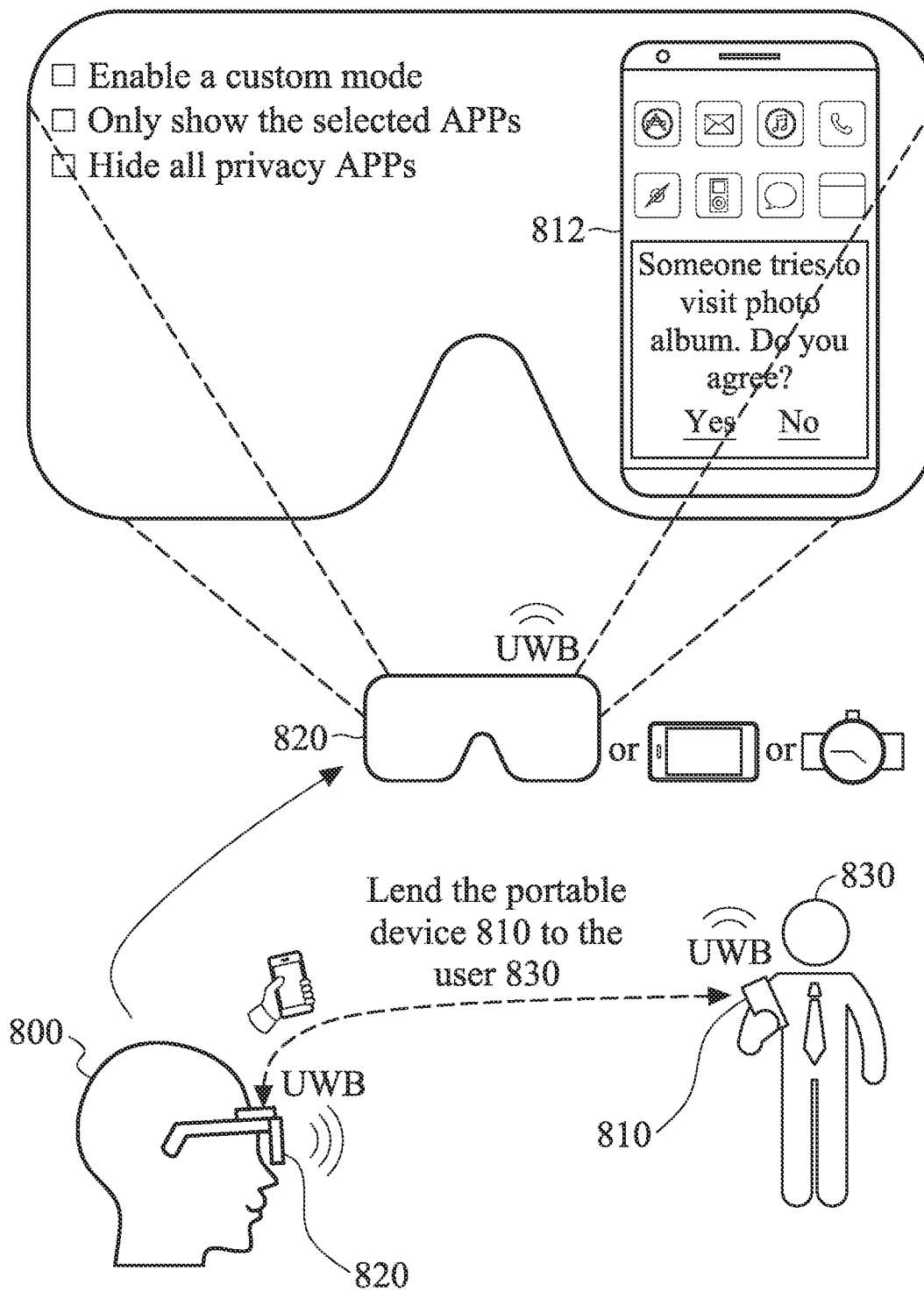
FIG. 8 is a schematic diagram showing a situation where the user has lent the portable device to another user according to an exemplary embodiment of the present disclosure.

FIG. 8 is a schematic diagram showing a situation where the user 800 has lent the portable device 810 to another user 830 according to an exemplary embodiment of the present disclosure.

First, the portable device 810 identifies that the user 800 has given the portable device 810 to the user 830 when either the portable device 810 or the wearable device 820 detects that the distance between the wearable device and the portable device is within a specific range and the portable device is not moving and being held by the user 830 based on the spatial information and the acceleration data obtained by the accelerometers and the UWB transceivers in the portable device 810 and the wearable device 820, wherein the range is from 1 m to 6 m.

Next, the portable device 810 detects whether the portable device 810 is unlocked and the portable device 810 is being used by the user 830, for example, the portable device 810 is interacting with the user 830, active APPs in the portable device 810 are changed by the user 830, privacy APPs in the portable device 810 are launched and viewed by the user 830, and so on.

When the portable device 810 is unlocked and the portable device 810 is being used by the user 830, the portable device 810 predicts that the user 800 has lent the portable device 810 to the user 830.

When the portable device 810 predicts that the user 800 has lent the portable device 810 to the user 830, the portable device 810 may transmit a notification to the wearable device 820 to notify the user 800 of the user's intent. For example, the lenses of the wearable device 820 may display some options (e.g., enable a custom mode, only show the selected APPs, hide all privacy APPs, etc.) for the user to operate the portable device 810. In another example, the lenses of the wearable device 820 may display the screen content 812 of the portable device 810 which has been lent to the user 830.

Example 5

Figure 9:
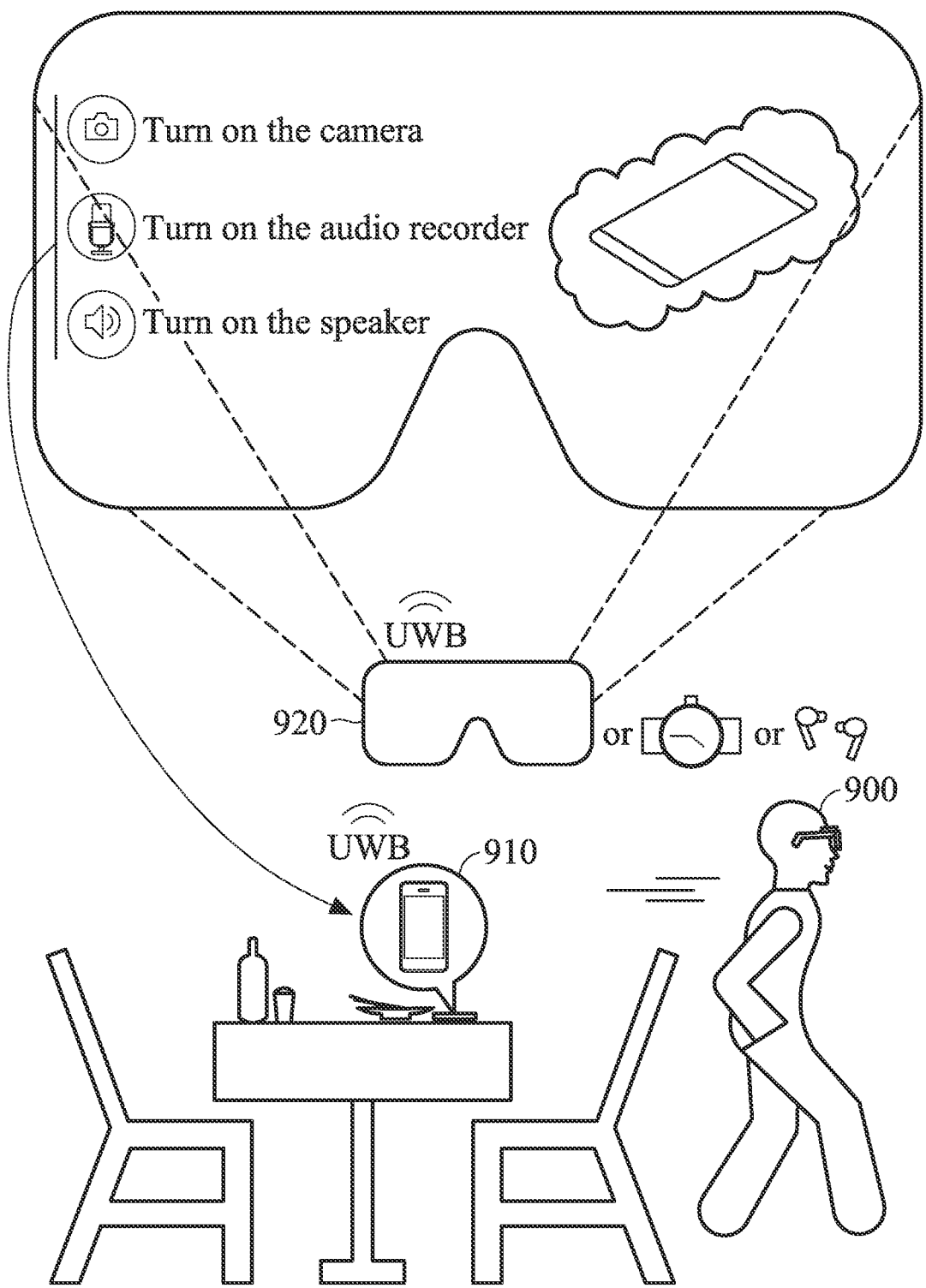
FIG. 9 is a schematic diagram showing a situation where the user is moving away from the portable device according to an exemplary embodiment of the present disclosure.

FIG. 9 is a schematic diagram showing a situation where the user 900 is moving away from the portable device 910 according to an exemplary embodiment of the present disclosure.

First, the portable device 910 identifies that the user 900 is moving away from the portable device 910 when either the portable device 910 or the wearable device 920 detects that the distance between the wearable device 920 and the portable device 910 is greater than a threshold, and the portable device 910 and the wearable device 920 are moving at different speeds based on the spatial information and the acceleration data obtained by the accelerometers and the UWB transceivers in the portable device 910 and the wearable device 920, wherein the threshold is 1 m.

Next, the portable device 910 detects whether the portable device 910 is locked or the portable device 910 is unlocked and keeps still.

When the portable device 910 is locked or the portable device 910 is unlocked and keeps still, the portable device 910 predicts that the portable device 910 is lost.

When the portable device 910 predicts that the portable device 910 is lost, the portable device 910 may transmit a notification to the wearable device 920 to notify the user 900 of the user's intent. For example, the lenses of the wearable device 920 may display the control user interface (UI) (e.g., turn on the camera, turn on the audio recorder, turn on the speaker, etc.) of the portable device 910 which is lost. In another example, the wearable device 920 may track the location of the portable device 910.

Example 6

Figure 10:
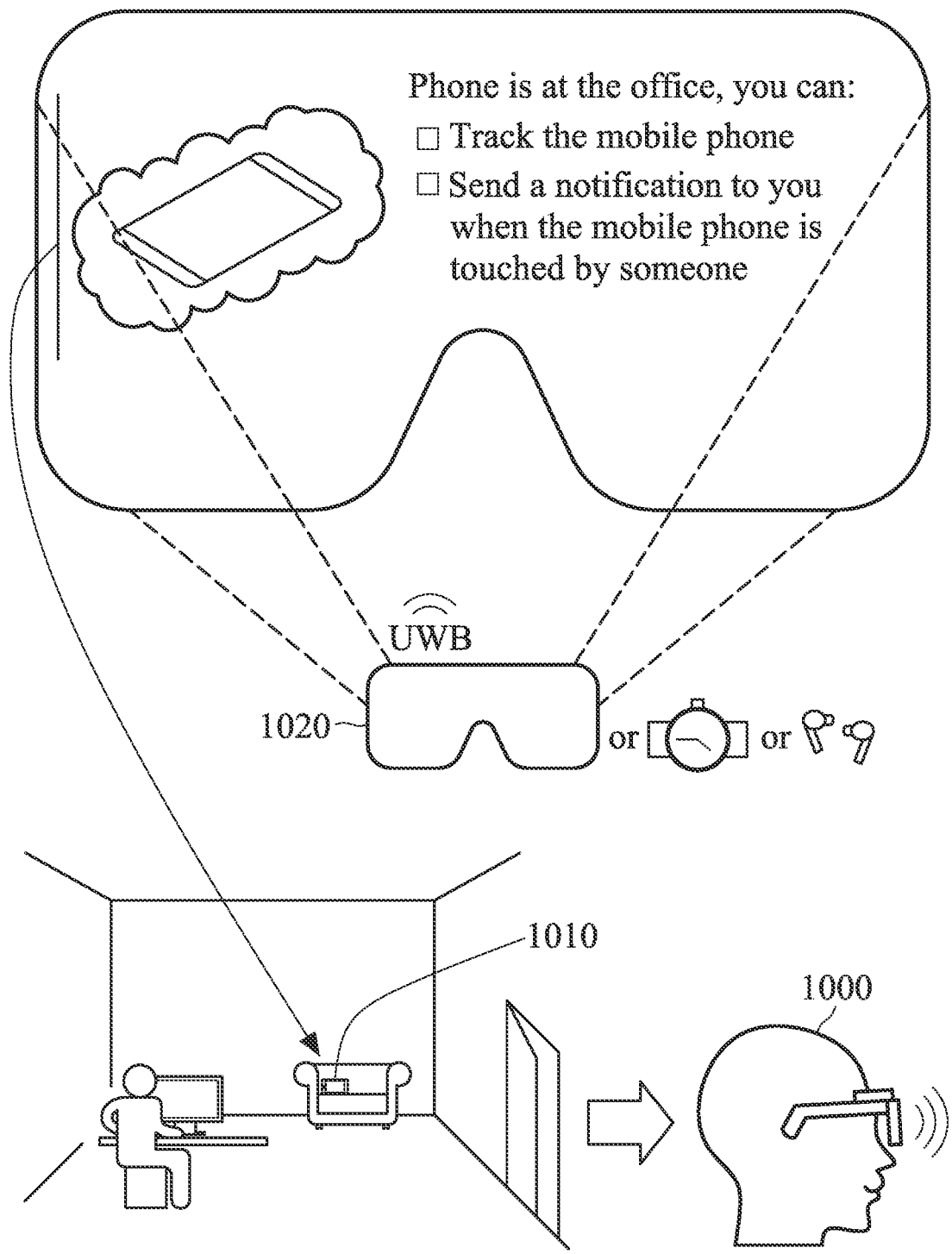
FIG. 10 is a schematic diagram showing a situation where the user is moving away from the portable device according to an exemplary embodiment of the present disclosure.

FIG. 10 is a schematic diagram showing a situation where a user 1000 is moving away from the portable device 1010 according to an exemplary embodiment of the present disclosure.

First, the portable device 1010 identifies that the user 1000 is moving away from the portable device 1010 when either the portable device 1010 or the wearable device 1020 detects that the distance between the wearable device 1020 and the portable device 1010 is greater than a threshold, and the portable device 1010 is not moving and the wearable device 1020 is moving based on the spatial information and the acceleration data obtained by the accelerometers and the UWB transceivers in the portable device 1010 and the wearable device 1020, wherein the threshold is 5 m.

Next, the portable device 1010 detects whether the portable device 1010 is in a specific location (e.g., home, office, and so on) and the portable device 1010 remains in a standby mode.

When the portable device 1010 is in a specific location and the portable device 1010 remains in standby mode, the portable device 1010 predicts that the user 1000 has forgotten the portable device 1010 and left it in the specific location.

When the portable device 1010 predicts that the user 1000 has left the portable device 1010 in the specific location, the portable device 1010 may transmit a notification to the wearable device 1020 to notify the user 1000 of user's intent. For example, the lenses of the wearable device 1020 may display a reminder to notify the user 1000 of where the portable device 1010 is located and display some options (e.g., track the mobile phone, send a notification to you when the mobile phone is touched by someone, etc.). In another example, the wearable device 1020 may also notify the user 1000 when the portable device 1010 has been unlocked by others and may report the latest location when the portable device 1010 is being moved by someone other than the user 1000.

As described above, the method and device for predicting user's intent disclosed in the present disclosure use the accelerometers to perceive the motion status of the devices and use the UWB measurements actively initiated by the devices to determine the separation and relative relationship between the devices. The purpose of controlling the user's devices or assisting the user's operation based on the user's intent can be achieved in the disclosure.

Figure 11:
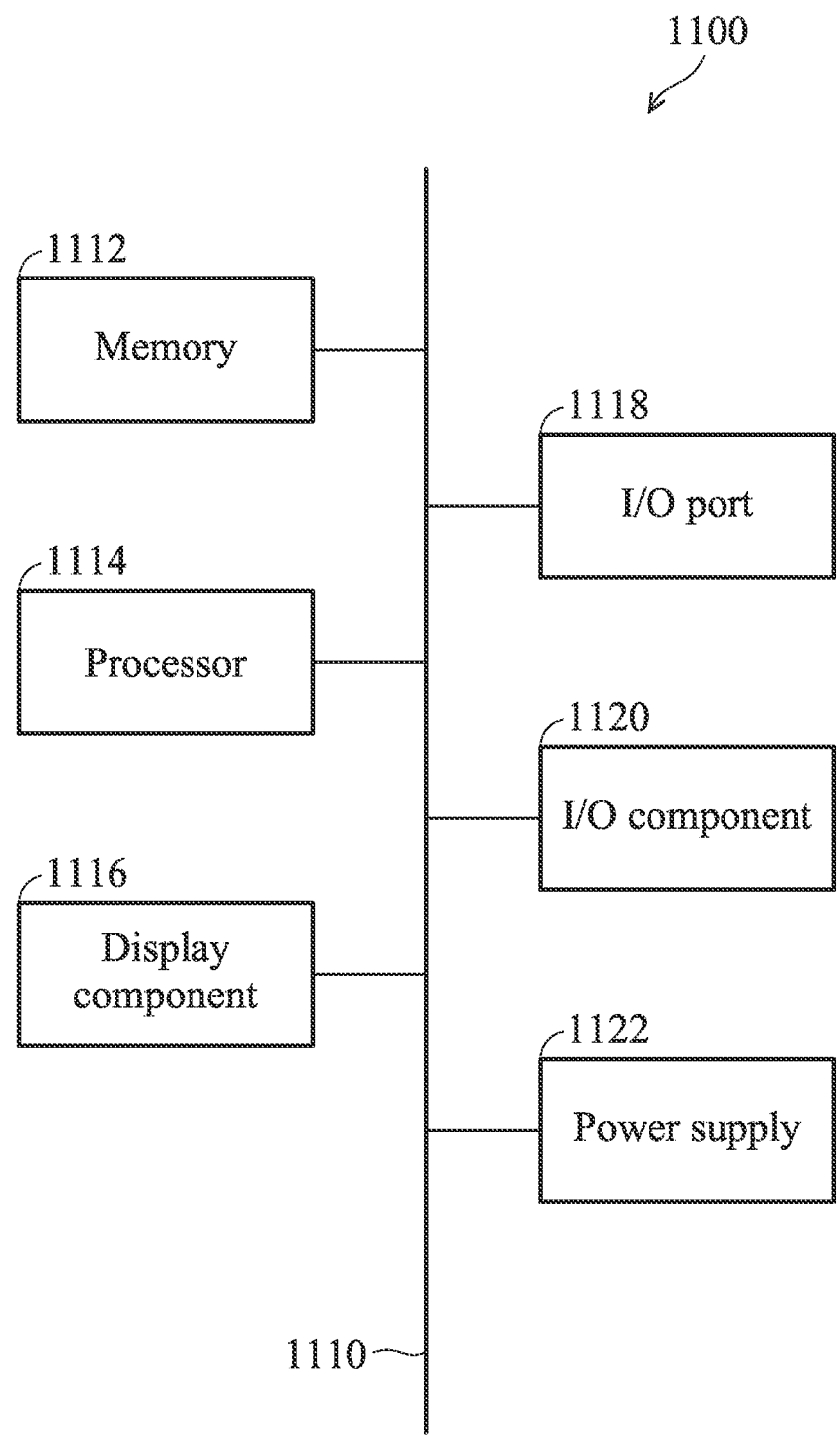
FIG. 11 shows an exemplary operating environment for implementing embodiments of the present disclosure.

Having described embodiments of the present disclosure, an exemplary operating environment in which embodiments of the present disclosure may be implemented is described below. Referring to FIG. 11, an exemplary operating environment for implementing embodiments of the present disclosure is shown and generally known as a computing device 1100. The computing device 1100 is merely an example of a suitable computing environment and is not intended to limit the scope of use or functionality of the disclosure. Neither should the computing device 1100 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 11, the computing device 1100 may include a bus 1110 that is directly or indirectly coupled to the following devices: one or more memories 1112, one or more processors 1114, one or more display components 1116, one or more input/output (I/O) ports 1118, one or more input/output components 1120, and an illustrative power supply 1122. The bus 1110 may represent one or more kinds of busses (such as an address bus, data bus, or any combination thereof). Although the various blocks of FIG. 11 are shown with lines for the sake of clarity, and in reality, the boundaries of the various components are not specific. For example, the display component such as a display device may be considered an I/O component and the processor may include a memory.

The computing device 1100 typically includes a variety of computer-readable media. The computer-readable media could be any available media that could be accessed by computing device 1100 and includes both volatile and nonvolatile media, removable and non-removable media. By way of example, but not limitation, computer-readable media may comprise computer storage media and communication media. The computer storage media may include volatile and nonvolatile, removable and non-removable media implemented in any method or technology for storage of information such as computer-readable instructions, data structures, program modules or other data. The computer storage media may include, but not limit to, random access memory (RAM), read-only memory (ROM), electricallyerasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which could be used to store the desired information and which could be accessed by the computing device 1100. The computer storage media may not comprise signal per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 1112 may include computer-storage media in the form of volatile and/or nonvolatile memory. The memory may be removable, non-removable, or a combination thereof. Exemplary hardware devices include solid-state memory, hard drives, optical-disc drives, etc. The computing device 1100 includes one or more processors that read data from various entities such as the memory 1112 or the I/O components 1120. The display component(s) 1116 present data indications to a user or other device. Exemplary presentation components include a display device, speaker, printing component, vibrating component, etc.

The I/O ports 1118 allow the computing device 1100 to be logically coupled to other devices including the I/O components 1120, some of which may be embedded. Illustrative components include a microphone, joystick, game pad, satellite dish, scanner, printer, wireless device, etc. The I/O components 1120 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, face recognition, biometric recognition, gesture recognition both on screen and adjacent to the screen, air gestures, head and eye tracking, touch recognition associated with displays on the computing device 1100, or any combination of. The computing device 1100 may be equipped with depth cameras, such as stereoscopic camera systems, infrared camera systems, RGB camera systems, any combination of these to realize gesture detection and recognition. Furthermore, the computing device 1100 may be equipped with accelerometers or gyroscopes that enable detection of motion. The output of the accelerometers or gyroscopes may be provided to the display of the computing device 1100 to carry out immersive augmented reality or virtual reality.

Furthermore, the processor 1114 in the computing device 1100 could execute the program code in the memory 1112 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," and "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for predicting user's intent, wherein the method is performed by a computing device and comprises:
    receiving spatial information and acceleration data from a portable device and a wearable device worn by a user, wherein the wearable device and the portable device are configured to measure the spatial information between each other via Ultra-Wideband (UWB) when either the wearable device or the portable device detects that an activity of the user or a motion status of either the wearable device or the portable device has changed based on the acceleration data measured by accelerometers in the wearable device and the portable device;
    identifying a behavior of the user using the wearable device and the portable device and predicting user's intent based on the spatial information and the acceleration data; and
    transmitting a notification signal to the wearable device to notify the user of user's intent or performing an operation in response to the user's intent.

2. The method for predicting user's intent as claimed in claim 1, wherein the spatial information comprises:
    a distance between the wearable device and the portable device;
    a direction angle of the wearable device relative to the portable device; and
    a relative relationship between the wearable device and the portable device.

3. The method for predicting user's intent as claimed in claim 1, wherein the activity of the user comprises driving a vehicle, riding a bicycle, running, walking, or sitting or standing still.

4. The method for predicting user's intent as claimed in claim 1, wherein the motion status comprises rising, rotating, tilting or falling.

5. The method for predicting user's intent as claimed in claim 1, wherein the computing device is either the wearable device or the portable device.

6. The method for predicting user's intent as claimed in claim 2, wherein identifying the behavior of the user using the wearable device and the portable device and predicting user's intent based on the spatial information and the acceleration data further comprises:
    identifying that the user is watching the portable device when detecting that the distance between the wearable device and the portable device is less than a first threshold, the portable device is in a field of view (FOV) of the wearable device and the wearable device is not in a FOV of the portable device, and the direction angle of the wearable device relative to the portable device is substantially equal to 0° based on the spatial information;

detecting whether the distance between the wearable device and the portable device is less than a second threshold and a head-tilt angle of the user is within a specific range based on the spatial information; and predicting that the user is watching the portable device with an incorrect posture when the distance between the wearable device and the portable device is less than the second threshold and the head-tilt angle of the user is within the specific range.

7. The method for predicting user's intent as claimed in claim 2, wherein identifying the behavior of the user using the wearable device and the portable device and predicting user's intent based on the spatial information and the acceleration data further comprises:

identifying that the user wants to take a selfie using the portable device when detecting that the distance between the wearable device and the portable device is within a specific range, the portable device is in the field of view (FOV) of the wearable device and the wearable device is in the FOV of the portable device, and the direction angle of the wearable device relative to the portable device is substantially equal to 0° based on the spatial information;

detecting whether the portable device is being held by the user and the wearable device and the portable device remain in a face-to-back (F2B) state for longer than a predetermined time; and predicting that the user is taking a selfie using the portable device when the portable device is being held by the user and the wearable device and the portable device remain in the F2B state for longer than the predetermined time.

8. The method for predicting user's intent as claimed in claim 2, wherein identifying the behavior of the user using the wearable device and the portable device and predicting user's intent based on the spatial information and the acceleration data further comprises:

identifying that the user wants to remotely take photos using the portable device when detecting that the distance between the wearable device and the portable device is greater than a threshold, the portable device is in a field of view (FOV) of the wearable device and the wearable device is in a FOV of the portable device, and the direction angle of the wearable device relative to the portable device is substantially equal to 0° based on the spatial information;

detecting whether the portable device is still or being held by another user and a camera application of the portable device is running based on the spatial information and the acceleration data; and predicting that the user is using the camera application to remotely take photos when the portable device is still or being held by another user and the camera application of the portable device is running.

9. The method for predicting user's intent as claimed in claim 2, wherein identifying the behavior of the user using the wearable device and the portable device and predicting user's intent based on the spatial information and the acceleration data further comprises:

identifying that the user has given the portable device to another user when detecting that the distance between the wearable device and the portable device is within a specific range and the portable device is not moving and being held by another user;

detecting whether the portable device is unlocked and the portable device is being used by another user; and predicting that the user has lent the portable device to another user when the portable device is unlocked and the portable device is being used by another user.

10. The method for predicting user's intent as claimed in claim 2, wherein identifying the behavior of the user using the wearable device and the portable device and predicting user's intent based on the spatial information and the acceleration data further comprises:

identifying that the user is moving away from the portable device when detecting that the distance between the wearable device and the portable device is greater than a threshold, and the portable device and the wearable device are moving at different speeds;

detecting whether the portable device is locked or the portable device is unlocked and keeps still; and predicting that the portable device is lost when the portable device is locked or the portable device is unlocked and keeps still.

11. The method for predicting user's intent as claimed in claim 2, wherein identifying the behavior of the user using the wearable device and the portable device and predicting user's intent based on the spatial information and the acceleration data further comprises:

identifying that the user is moving away from the portable device when detecting that the distance between the wearable device and the portable device is greater than a threshold, and the portable device is not moving and the wearable device is moving;

detecting whether the portable device is in a specific location and the portable device remains in a standby mode; and predicting that the user has left the portable device in the specific location when the portable device is in the specific location and the portable device remains in the standby mode.

12. A device for predicting user's intent, comprising:
one or more processors; and
one or more computer storage media for storing one or more computer-readable instructions, wherein the processor is configured to drive the computer storage media to execute the following tasks:
receiving spatial information and acceleration data from a portable device and a wearable device worn by a user, wherein the wearable device and the portable device are configured to measure the spatial information between each other via Ultra-Wideband (UWB) when either the wearable device or the portable device detects that an activity of the user or a motion status of either the wearable device or the portable device has changed based on the acceleration data measured by accelerometers in the wearable device and the portable device;
identifying a behavior of the user using the wearable device and the portable device and predicting user's intent based on the spatial information and the acceleration data; and
transmitting a notification signal to the wearable device to notify the user of user's intent or performing an operation in response to the user's intent.

13. The device for predicting user's intent as claimed in claim 12, wherein the spatial information comprises:

a distance between the wearable device and the portable device;
a direction angle of the wearable device relative to the portable device; and
a relative relationship between the wearable device and the portable device.

14. The device for predicting user's intent as claimed in claim 12, wherein the activity of the user comprises driving a vehicle, riding a bicycle, running, walking, or sitting or standing still.

15. The device for predicting user's intent as claimed in claim 12, wherein the motion status comprises rising, rotating, tilting or falling.

16. The device for predicting user's intent as claimed in claim 12, wherein the device is either the wearable device or the portable device.

17. The device for predicting user's intent as claimed in claim 13, wherein identifying the behavior of the user using the wearable device and the portable device and predicting user's intent based on the spatial information and the acceleration data further comprises:
identifying that the user is watching the portable device when detecting that the distance between the wearable device and the portable device is less than a first threshold, the portable device is in a field of view (FOV) of the wearable device and the wearable device is not in a FOV of the portable device, and the direction angle of the wearable device relative to the portable device is substantially equal to 0° based on the spatial information;
detecting whether the distance between the wearable device and the portable device is less than a second threshold and a head-tilt angle of the user is within a specific range based on the spatial information; and
predicting that the user is watching the portable device with an incorrect posture when the distance between the wearable device and the portable device is less than the second threshold and the head-tilt angle of the user is within the specific range.

18. The device for predicting user's intent as claimed in claim 13, wherein identifying the behavior of the user using the wearable device and the portable device and predicting user's intent based on the spatial information and the acceleration data further comprises:
identifying that the user wants to take a selfie using the portable device when detecting that the distance between the wearable device and the portable device is within a specific range, the portable device is in the field of view (FOV) of the wearable device and the wearable device is in the FOV of the portable device, and the direction angle of the wearable device relative to the portable device is substantially equal to 0° based on the spatial information;
detecting whether the portable device is being held by the user and the wearable device and the portable device remain in a face-to-back (F2B) state for longer than a predetermined time; and
predicting that the user is taking a selfie using the portable device when the portable device is being held by the user and the wearable device and the portable device remain in the F2B state for longer than the predetermined time.

19. The device for predicting user's intent as claimed in claim 13, wherein identifying the behavior of the user using the wearable device and the portable device and predicting user's intent based on the spatial information and the acceleration data further comprises:
identifying that the user wants to remotely take photos using the portable device when detecting that the distance between the wearable device and the portable device is greater than a threshold, the portable device is in a field of view (FOV) of the wearable device and the wearable device is in a FOV of the portable device, and the direction angle of the wearable device relative to the portable device is substantially equal to 0° based on the spatial information;
detecting whether the portable device is still or being held by another user and a camera application of the portable device is running based on the spatial information and the acceleration data; and
predicting that the user is using the camera application to remotely take photos when the portable device is still or being held by another user and the camera application of the portable device is running.

20. The device for predicting user's intent as claimed in claim 13, wherein identifying the behavior of the user using the wearable device and the portable device and predicting user's intent based on the spatial information and the acceleration data further comprises:
identifying that the user has given the portable device to another user when detecting that the distance between the wearable device and the portable device is within a specific range and the portable device is not moving and being held by another user;
detecting whether the portable device is unlocked and the portable device is being used by another user; and
predicting that the user has lent the portable device to another user when the portable device is unlocked and the portable device is being used by another user.

21. The device for predicting user's intent as claimed in claim 13, wherein identifying the behavior of the user using the wearable device and the portable device and predicting user's intent based on the spatial information and the acceleration data further comprises:
identifying that the user is moving away from the portable device when detecting that the distance between the wearable device and the portable device is greater than a threshold, and the portable device and the wearable device are moving at different speeds;
detecting whether the portable device is locked or the portable device is unlocked and keeps still; and
predicting that the portable device is lost when the portable device is locked or the portable device is unlocked and keeps still.

22. The device for predicting user's intent as claimed in claim 13, wherein identifying the behavior of the user using the wearable device and the portable device and predicting user's intent based on the spatial information and the acceleration data further comprises:
identifying that the user is moving away from the portable device when detecting that the distance between the wearable device and the portable device is greater than a threshold, and the portable device is not moving and the wearable device is moving;
detecting whether the portable device is in a specific location and the portable device remains in a standby mode; and
predicting that the user has left the portable device in the specific location when the portable device is in the specific location and the portable device remains in the standby mode.

* * * * *